US010041445B2

(12) United States Patent
Berdoyes et al.

(10) Patent No.: US 10,041,445 B2
(45) Date of Patent: Aug. 7, 2018

(54) NOZZLE HAVING A MOVABLE DIVERGENT SECTION WITH A THERMAL PROTECTION SYSTEM

(71) Applicant: HERAKLES, Le Haillan (FR)

(72) Inventors: Michel Berdoyes, Cestas (FR); Alain Remigi, Cestas (FR); Jean-Michel Larrieu, Macau (FR)

(73) Assignee: ARIANEGROUP SAS, Paris (FR)

( * ) Notice: Subject to any disclaimer, the term of this patent is extended or adjusted under 35 U.S.C. 154(b) by 540 days.

(21) Appl. No.: 14/767,934

(22) PCT Filed: Feb. 13, 2014

(86) PCT No.: PCT/FR2014/050293
§ 371 (c)(1),
(2) Date: Aug. 14, 2015

(87) PCT Pub. No.: WO2014/125221
PCT Pub. Date: Aug. 21, 2014

(65) Prior Publication Data
US 2015/0369175 A1 Dec. 24, 2015

(30) Foreign Application Priority Data
Feb. 15, 2013 (FR) ...................................... 13 00337

(51) Int. Cl.
*F02K 9/84* (2006.01)
*F02K 1/00* (2006.01)
(Continued)

(52) U.S. Cl.
CPC ................ *F02K 9/84* (2013.01); *F02K 1/004* (2013.01); *F02K 9/97* (2013.01); *F02K 9/80* (2013.01); *F05D 2260/98* (2013.01)

(58) Field of Classification Search
CPC ... F02K 1/004; F02K 9/80; F02K 9/84; F02K 9/97
See application file for complete search history.

(56) References Cited

U.S. PATENT DOCUMENTS 3,090,198 A * 5/1963 Zeisloft ..................... F02K 9/84
239/265.25
3,106,061 A * 10/1963 Eder ......................... F02K 9/84
239/265.15
(Continued)

FOREIGN PATENT DOCUMENTS

DE  31 19 183 A1   12/1982
FR  1 359 870       4/1964
(Continued)

OTHER PUBLICATIONS

International Search Report as issued in International Patent Application No. PCT/FR2014/050293, dated Jun. 6, 2014.

*Primary Examiner* — Lorne Meade
(74) *Attorney, Agent, or Firm* — Pillsbury Winthrop Shaw Pittman LLP

(57) ABSTRACT

A nozzle having a movable diverging section, the nozzle including a stationary throat forming a ball joint and a diverging section having a top portion that is movably mounted around the throat; an annular lubrication chamber being interposed between the stationary throat and the top portion of the diverging section, the annular lubrication chamber containing a grease seal; an annular throttling element arranged between the stationary throat and the diverging section downstream from the annular lubrication chamber, the annular throttling element being made of refractory material; and an annular thermal protection element arranged between the stationary throat and the diverging section downstream from the annular lubrication chamber and upstream from the annular throttling element, the
(Continued)

annular thermal protection element closing the lubrication chamber in its bottom portion.

7 Claims, 1 Drawing Sheet

(51) Int. Cl.
  *F02K 9/97* (2006.01)
  *F02K 9/80* (2006.01)

(56) References Cited

U.S. PATENT DOCUMENTS

| | | | | |
|---|---|---|---|---|
| 3,140,584 A | * | 7/1964 | Ritchey | F02K 9/84 239/265.35 |
| 3,142,153 A | * | 7/1964 | Hensley | F02K 9/84 239/265.35 |
| 3,302,885 A | | 2/1967 | Herbert | |
| 3,362,646 A | * | 1/1968 | Connolly | F02K 9/84 239/265.15 |
| 3,570,768 A | | 3/1971 | Conway et al. | |
| 3,912,172 A | | 10/1975 | Bolner | |
| 4,108,381 A | | 8/1978 | Sottosanti et al. | |
| 4,350,297 A | * | 9/1982 | Martin | F02K 9/84 239/265.35 |
| 4,458,595 A | * | 7/1984 | Gerrish, Jr. | F02K 9/346 102/290 |
| 4,666,084 A | * | 5/1987 | Mitchell | F02K 9/84 239/265.19 |
| 6,554,936 B1 | * | 4/2003 | Metcalf | C08K 5/09 156/169 |
| 6,948,307 B2 | | 9/2005 | Berdoyes et al. | |
| 7,313,910 B2 | * | 1/2008 | Kim | F42B 10/665 60/228 |
| 7,980,057 B2 | * | 7/2011 | Facciano | B29C 70/28 239/265.11 |
| 8,276,361 B2 | * | 10/2012 | Garbe | F02K 9/84 277/537 |
| 2016/0084200 A1 | * | 3/2016 | Isaac | F02K 9/84 60/232 |

FOREIGN PATENT DOCUMENTS

FR    2 841 939 A1    1/2004
FR    2 844 557 A1    3/2004

* cited by examiner

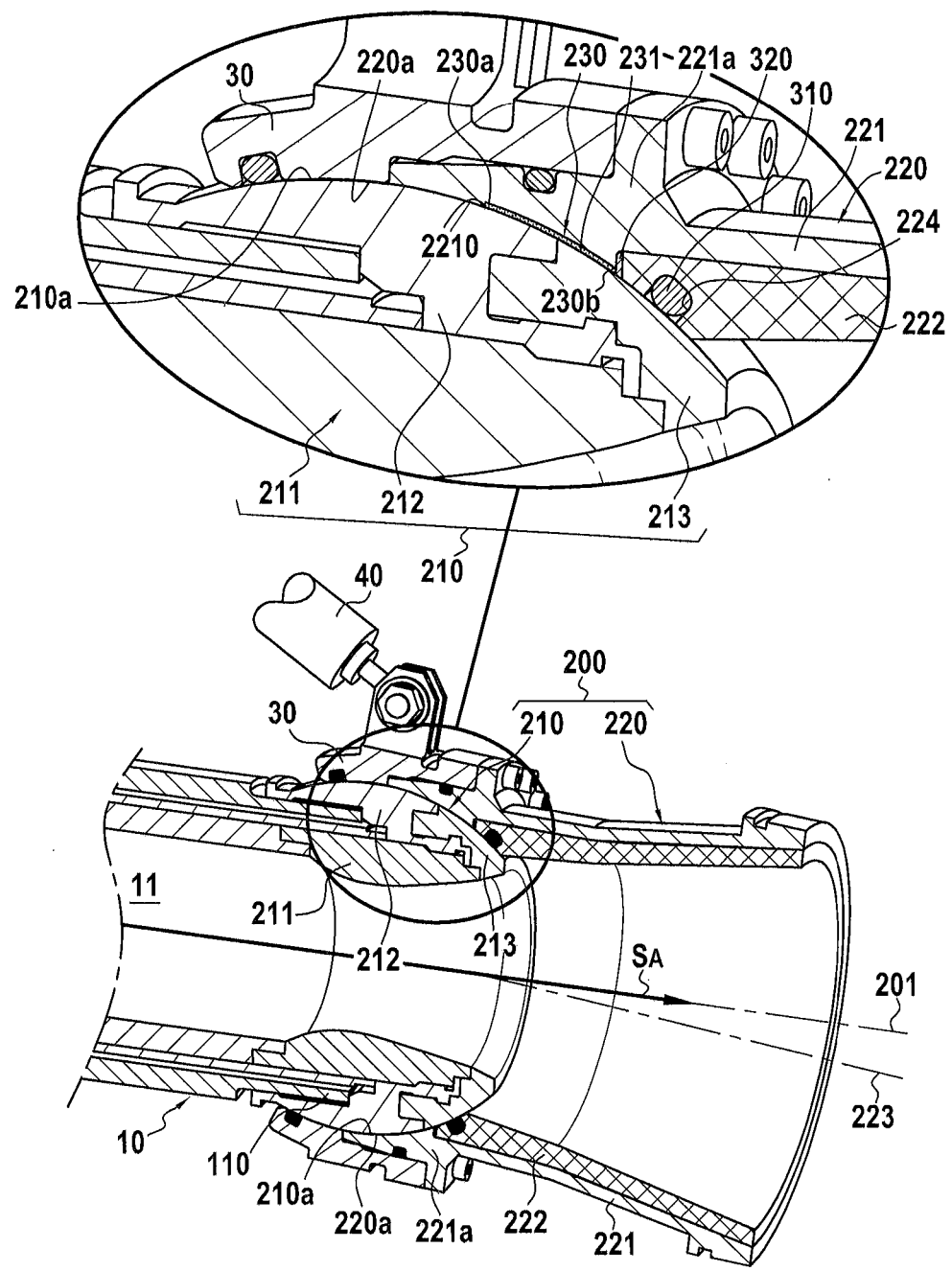

NOZZLE HAVING A MOVABLE DIVERGENT SECTION WITH A THERMAL PROTECTION SYSTEM

CROSS REFERENCE TO RELATED APPLICATIONS

This application is the U.S. National Stage of PCT/FR2014/050293, filed Feb. 13, 2014, which in turn claims priority to French Patent Application No. 1300337, filed Feb. 15, 2013. The contents of all of these applications are incorporated herein by reference in their entirety.

BACKGROUND OF THE INVENTION

The present invention relates to rocket engine nozzles having movable diverging sections. The field of application of the invention is more particularly but not exclusively that of missiles.

A nozzle with a movable diverging section generally makes use of a ball joint or sphere/sphere type connection between the stationary throat and the movable diverging section of the nozzle. The technology making use of a movable diverging section for steering thrust presents numerous advantages, for given bulk, compared with other known technologies for steering thrust such as those making use of a steerable nozzle on a flexible abutment, for example. Nozzles in which only the diverging section is movable present capacities for thrust deflection that are considerably greater than those that can be obtained with steerable nozzles in which the entire passage of the nozzle is movable. This improvement in thrust deflection can be explained by the presence, in the movable zone of the diverging section and in the tilted configuration, of an asymmetrical pressure field that leads to a gain that is greater than 1 compared with the geometrical effect on its own. This technology and its advantages compared with other types of steerable nozzle are described in particular in Document U.S. Pat. No. 6,948,307.

Nevertheless, in this type of nozzle, the throat and the portion of the diverging section that is in sliding contact with the throat can be subjected to high levels of thermal-erosion phenomena. Under certain conditions of tilting the diverging section, the combustion gas can present not only a temperature that is very high, but also a circumferential speed that is very high (potentially sonic). In order to withstand these thermal-erosion effects, parts constituting the ball joint connection are made of thermostructural composite materials, which are known for their good mechanical properties and for their ability to conserve those properties at high temperature. In particular, they comprise carbon/carbon (C/C) composites made of carbon fiber reinforcement densified with a carbon matrix.

Thermostructural composite materials are high performance materials and consequently they have a high manufacturing cost.

In addition, when using parts made of C/C composite material for the ball joint connection, the coefficient of friction between those parts increases with increasing temperature, thereby requiring higher activation power in order to tilt the diverging section while it is in operation.

There thus exists a need to have a solution enabling a nozzle with a movable diverging section to be made at lower manufacturing costs and requiring lower activation energy.

OBJECT AND BRIEF SUMMARY OF THE INVENTION

To this end, the present invention proposes a nozzle having a movable diverging section, the nozzle comprising a stationary throat forming a ball joint and a diverging section having a top portion that is movably mounted around the throat, an annular lubrication chamber being interposed between the throat and the top portion of the diverging section, said chamber containing a grease seal, said nozzle being characterized in that it further comprises:

an annular throttling element arranged between the throat and the diverging section downstream from the lubrication chamber, said throttling element being made of refractory material; and an annular thermal protection element arranged between the throat and the diverging section downstream from the lubrication chamber and upstream from the throttling element, said thermal protection element closing the lubrication chamber in its bottom portion.

By using a thermal protection system with two levels of protection (throttling closest to the combustion gas and thermal barrier upstream), the temperature of the parts constituting the ball joint connection, namely the throat and the top portion of the diverging section that is in sliding contact therewith, does not increase while the nozzle is in operation, and this applies even for durations of operation that are relatively long (several minutes). A so-called "cold" ball joint connection is thus provided that does not require the use of materials capable of withstanding very high temperatures, such as thermostructural composite materials, which by definition are expensive materials. In the nozzle of the invention, the parts forming the ball joint connection may be made out of low cost materials such as metal materials.

In addition, since the temperature of the connection parts does not increase while the nozzle is in operation, these parts expand little, and the coefficient of friction remains low compared with that present between parts made of thermostructural composite material subjected to high temperatures. Consequently, in the nozzle of the invention, the power that needs to be delivered to the actuator means (e.g. hydraulic actuators) in order to tilt the diverging section is lower.

Furthermore, because of the throttling element placed downstream from the thermal protection element, the grease seal is well protected against combustion gas and it is properly kept in position. The thermal protection element acts as a thermal barrier against the combustion gas that might pass the first level formed by the throttling element but then has only a thermal convection effect, since beyond the throttling element the gas has a circumferential speed that is considerably reduced.

In a first aspect of the invention, the throttling element comprises a gland made of carbon fibers.

In a second aspect of the invention, the throttling element comprises a ring of thermostructural composite material selected from at least: carbon/carbon composite material and ceramic matrix composite (CMC) material.

In a third aspect of the invention, the thermal protection element comprises an annular gasket made of graphite or of graphite-filled polytetrafluoroethylene (PTFE).

In a fourth aspect of the invention, the throat is made at least in part out of a metal material.

In a fifth aspect of the invention, the portions of the throat and of the diverging section that are in contact with the throttling element comprise a rigidimer thermal protection material.

The invention also provides a thruster or rocket engine, characterized in that it includes a nozzle with a movable diverging section of the invention.

BRIEF DESCRIPTION OF THE DRAWING

The invention can be better understood on reading the following description given by way of non-limiting indication and with reference to the sole FIGURE, which shows a nozzle with a movable diverging section in an embodiment of the invention.

DETAILED DESCRIPTION OF EMBODIMENT OF THE INVENTION

The sole FIGURE is a diagram showing the rear portion of a rocket engine having a casing 10 surrounding a combustion chamber 11 that receives a block of solid propellant (not shown). The chamber 11 opens out through the rear end wall 110 of the casing, upstream from a nozzle 200 having a throat 210 and a diverging section 220, with the upstream to downstream direction in the nozzles being indicated in FIG. 1 by arrow $S_A$ corresponding to the flow direction of the combustion gas.

The throat 210, which defines not only the throat of the nozzle proper but also the converging section and a beginning of the diverging section, is fastened to the end wall 110 of the casing 10 so as to be secured thereto, e.g. by screw fastening. In the presently-described example, the throat part is constituted mainly by a first portion or throat part 211 made of a thermostructural material or of a thermally insulating composite material of rigidimer type, a second portion 212 made of a metal material, and a third portion 213 made of a thermally insulating material, such as a composite of rigidimer type (e.g. a material comprising carbon or silica reinforcement and a matrix made of phenolic resin), the third portion 213 being fastened to the downstream end of the second portion 212. In a variant embodiment, the throat portion 211 may be made of a metal material such as tungsten or molybdenum.

The diverging section 220 is movably mounted via its top portion 221a on the throat 210 which is stationary and secured to the casing 10. In the presently-described example, the part constituting the movable diverging section comprises a casing 221 that may be made for example out of metal that is provided on its inside portion with a coating 222 of thermally insulating material such as a composite of rigidimer type (e.g. a material formed by carbon or silica reinforcement and a matrix made of phenolic resin).

The throat 210 and the diverging section 220 are mutually in contact via respective spherical surfaces 210a, 220a centered on the axis 201 of the nozzle and thus form a hinged connection of the ball joint or sphere/sphere type. The diverging section 220 is then movable on the throat 210 in several directions. Thus, by tilting the diverging section, thrust is steered as a function of the angle formed between the axis 223 of the diverging section and the axis 201 of the nozzle.

The movable diverging section is connected to the stationary portion of the nozzle (not shown) via a ring 30 and actuators 40 that serve to control the tilting of the diverging section. This type of assembly forming a nozzle having a movable diverging section is itself well known and is not described in greater detail. An embodiment of such a nozzle is described in particular in Document U.S. Pat. No. 6,948,307.

Naturally, other known types of mounting and actuation for a movable diverging section on a stationary portion of a nozzle could naturally be envisaged.

An annular lubrication chamber 230 containing a grease seal 231 is formed in a gap present between the throat 210 and the top portion 221a of the diverging section 220. The lubrication chamber 230 is closed at its top portion 230a, i.e. downstream, by a shoulder 2210 formed in the casing 221 of the diverging section, and it is open in its bottom portion 230b, i.e. upstream, situated closest to the combustion gas ejected by the throat portion 210 and the diverging section 220. The grease seal serves both to facilitate moving the ball joint connection between the diverging section and the throat, and to provide sealing between those two parts.

In accordance with the invention, the nozzle is also provided with a thermal protection and sealing system that comprises a throttling element constituted in this example by a carbon fiber gland 310 housed in an annular groove 224 formed in the inside surface of the coating 222 of the diverging section 220, and a thermal barrier formed in this example by a gasket 320 made of graphite (Sigraflex®) and situated between the lubrication chamber 230 and the throttling element.

The gland 310 is arranged between the throat 210 and the top portion 221a of the diverging section 220 downstream from the lubrication chamber 230. The graphite gasket 320 is arranged between the throat and the diverging section upstream from the gland 310. The gasket 320 closes the bottom portion 230b of the lubrication chamber 230 against which it is placed, thereby serving to hold the grease seal 231 in position.

The gland 310 serves to throttle the combustion gas that, in this location of the nozzle and in certain tilting configurations of the diverging section, can present a circumferential speed that is high (potentially sonic) that might damage the integrity of the gasket 320, and consequently the integrity of the grease seal 231. The gasket 320 acts as a thermal barrier against any combustion gas that passes the first level formed by the gland but that then presents a thermal convection effect only at this level, since its circumferential speed has been considerably reduced by the gland 310. The grease seal is thus well protected against thermal-erosion effects of the combustion gas.

By using a thermal protection system having two levels of protection (throttling closer to the combustion gas and thermal barrier upstream), the temperature of the parts constituting the ball joint, namely the throat and the top portion of the diverging section that is in sliding contact therewith, does not increase while the nozzle is in operation, even when it is in operation for durations that are relatively long (several minutes). A so-called "cold" ball joint connection is thus made that enables the connection parts to be made of low-cost materials such as metal materials that are less expensive than composite materials suitable for withstanding very high temperatures.

In the presently-described example, the thermal protection system is reinforced by making an additional thermal protection barrier at the portions of the throat and of the diverging section that are directly exposed to the combustion gas, namely the portion 213 of the throat and the internal coating 222 of the diverging section, which are made of thermally insulating material.

The movable diverging nozzle of the invention may be used in thrusters or rocket engines using solid propellants, liquid propellants, or that are hybrid (using both solid and liquid propellants).

The invention claimed is:
1. A nozzle having a movable diverging section, the nozzle comprising:
   a stationary throat having an exterior spherical surface forming a ball of a ball joint;

the movable diverging section having a top portion with an interior spherical surface forming a socket of the ball joint, the interior spherical surface in contact with and movably mounted around the exterior spherical surface;

an annular lubrication chamber interposed between the exterior spherical surface and the interior spherical surface of the top portion of the movable diverging section, said annular lubrication chamber containing a grease seal;

an annular throttling element arranged between the exterior spherical surface and the movable diverging section downstream from the annular lubrication chamber, said annular throttling element being made of refractory material; and an annular thermal protection element arranged between the exterior spherical surface and the movable diverging section downstream from the annular lubrication chamber and upstream from the annular throttling element, said annular thermal protection element closing a bottom portion of the lubrication chamber, wherein downstream is the direction of a combustion gas flow through the stationary throat towards the movable diverging section.

2. A nozzle according to claim 1, wherein the annular throttling element comprises a gland made of carbon fibers.

3. A nozzle according to claim 1, wherein the annular throttling element comprises a ring of thermostructural composite material selected from at least: carbon/carbon composite material and ceramic matrix composite material.

4. A nozzle according to claim 1, wherein the annular thermal protection element comprises an annular gasket made of graphite or of graphite-filled polytetrafluoroethylene (PTFE).

5. A nozzle according to claim 1, wherein the stationary throat is made at least in part out of a metal material.

6. A nozzle according to claim 1, wherein portions of the stationary throat and of the movable diverging section that are in contact with the annular throttling element comprise a rigidimer thermal protection material.

7. A thruster, comprising a nozzle with a movable diverging section according to claim 1.

* * * * *